United States Patent [19]

Matsumoto et al.

[11] Patent Number: 4,771,303
[45] Date of Patent: Sep. 13, 1988

[54] VARIABLE FOCAL LENGTH CAMERA

[75] Inventors: Toshiaki Matsumoto, Osaka; Takeo Hoda, Kawachinagano; Yoshiaki Hata, Nishinomiya; Masatoshi Kamitani, Osaka; Norihiro Inoue, Nara, all of Japan

[73] Assignee: Minolta Camera Kabushiki Kaisha, Osaka, Japan

[21] Appl. No.: 59,378

[22] Filed: Jun. 5, 1987

Related U.S. Application Data

[63] Continuation of Ser. No. 796,255, Nov. 8, 1985, abandoned.

[30] Foreign Application Priority Data

| Nov. 10, 1984 | [JP] | Japan | 59-237138 |
| Nov. 15, 1984 | [JP] | Japan | 59-240947 |
| Nov. 15, 1984 | [JP] | Japan | 59-240948 |
| Nov. 15, 1984 | [JP] | Japan | 59-173599 |
| Dec. 7, 1984 | [JP] | Japan | 59-186299 |
| Dec. 8, 1984 | [JP] | Japan | 59-259700 |
| Dec. 8, 1984 | [JP] | Japan | 59-186524 |

[51] Int. Cl.$^4$ ............... G03B 3/00; G03B 17/02
[52] U.S. Cl. ........................ 354/195.12; 354/288
[58] Field of Search ................ 354/195.12, 288

[56] References Cited

U.S. PATENT DOCUMENTS

| 4,204,760 | 5/1980 | Kobayashi | 354/195.12 |
| 4,451,129 | 5/1984 | Ikari et al. | 354/195.12 X |
| 4,525,050 | 6/1985 | Ohashi | 354/195.12 |

FOREIGN PATENT DOCUMENTS

| 464658 | 4/1950 | Canada | 354/288 |
| 59-165040 | 9/1984 | Japan. | |

Primary Examiner—Donald A. Griffin
Attorney, Agent, or Firm—Burns, Doane, Swecker & Mathis

[57] ABSTRACT

The present invention provides a bifocal camera capable of changing focal length of a photographic lens system and having lens drive means operable by a motor to switch the photographic lens system between a first focal length state wherein a main lens component is located at a rear position and a second focal length state wherein the main lens component is located at a front position and an auxiliary lens component is located at an operative position. This camera comprises a device for automatically stopping the motor when shifting of the main lens component is interrupted by force, and a device for restricting the shifting of the main lens component between the front position and the rear position. The auxiliary lens component is moved and a lens barrier is opened and closed in interlocked relationship with the shifting of the main lens component.

31 Claims, 12 Drawing Sheets

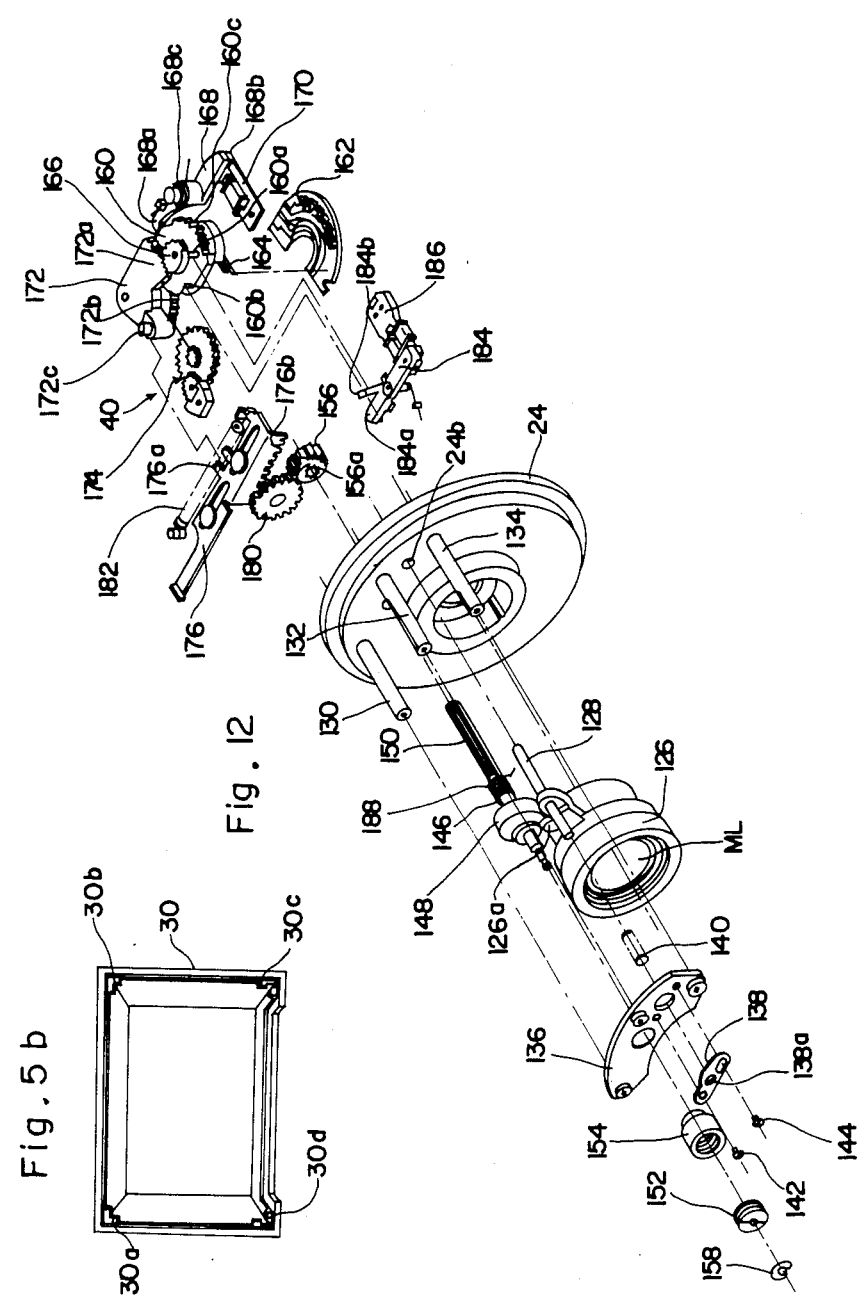

VARIABLE FOCAL LENGTH CAMERA

This application is a continuation of application Ser. No. 796,255, filed Nov. 8, 1985 now abandoned.

BACKGROUND OF THE INVENTION

1. Field of the Invention

The present invention relates to a bifocal camera and a camera with a zoom lens capable of changing focal length of a photographic lens system to permit the user to switch the photographic lens system for a plurality of focal length states to choose, for example, between a standard focal length state and a long focal length state or between a wide angle state and the standard state.

2. Description of the Prior Art

A photographic optical system employed with a bifocal camera as noted above is known, for example, from Japanese patent applications laid open under Nos. 59-42513 and 59-67511. A construction for shifting a main lens component back and forth along an optical axis is also known. In the known constructions, a main lens holder shiftable back and forth along guide grooves parallel to the optical axis is urged by a spring to a forward position, and is shifted back and forth through engagement with a gear rotatable by a rack and motor mounted adjacent the main lens holder. A special stopper mechanism is also provided to stop the main lens holder at predetermined positions (as disclosed in a Japanese patent application laid open under No. 57-146231, for example).

This known construction, however, requires the special stopper mechanism noted above and therefore even a stopper release mechanism to release a stopping action of the stopper mechanism prior to actuation of the motor, rendering the construction very complicated. The prior construction has a further disadvantage of being troublesome in operation since the stopper release mechanism must be manually operated prior to the actuation of the motor for shifting the main lens holder.

Furthermore, according to the known construction the motor is stopped only when the main lens component reaches one of the predetermined positions for the first or second focal length state.

With the known construction, therefore, the motor continues to receive an electric current for locking the motor even when the shifting of the main lens component is forcibly interrupted by some obstacle. This causes an undue force acting on a drive mechanism for shifting the main lens component as well as overheating of the motor, which result in damage to the camera.

In a further example of prior art construction a cam and cam follower combination is employed for pivoting an auxiliary lens component between an operative position on a photographic optical path and a retracted position off the photographic optical path (as disclosed in a Japanese patent application laid open under No. 59-17540).

This prior construction has the problem that, since the cam is defined on a pivotable member supporting the auxiliary lens component, its cam surface inevitably has a steep incline. In other words, the auxiliary lens support member is primarily for supporting the auxiliary lens component and therefore has a small axial dimension. Since the cam is defined on the support member having a small axial dimension, its cam surface must be steep thereby requiring a great force for pivoting the auxiliary lens component and shifting the main lens component axially which is detrimental to smooth pivoting of the auxiliary lens component. Such an inconvenience could of course be avoided by elongating the auxiliary lens holder in the axial direction, but then the entire camera must be long in the axial direction which is contrary to compact designing of the camera.

A lens barrier covering the front face of the main lens component is also known but conventionally it is used only with a monofocal camera incapable of focal length switching. A device for opening and closing the barrier is mounted adjacent the photographic lens assembly.

If, however, such a prior art construction is applied at it is to a bifocal camera with the main lens component shiftable over a considerable length in the axial direction, the portion surrounding the main lens compenent must be massive and heavy and imbalance in shape and weight of the entire camera becomes notable particularly when the main lens component is shifted to a front position. Besides, since the device for operating the lens barrier is also shiftable axially, it is difficult to utilize this device for operating other elements such as for vertically shifting a flash unit.

To eliminate these disadvantages the barrier operating device may be mounted in a main body of the camera and interlocked with the barrier, but then the interlocking mechanism must have a great length since the main lens portion including the lens barrier is moved over a great axial length. It is also necessary to absorb an amount of backward shifting of the main lens component and this renders the interlocking mechanism even more complicated.

With the bifocal camera, various devices such as a lens shifting device and an aperture device shift axially together with the main lens component. It has been one of the problems of the bifocal camera how power of a drive device mounted in the camera body should be transmitted to these driven devices.

In order to solve this problem a prior art construction has a drive gear mounted in a camera body and operatively connected to a lens drive device, a hollow rotary shaft integral with the drive gear and defining an axial groove, an inner shaft mounted in the hollow shaft to be slidable relative thereto and including a pin in engagement with the groove, and a gear fixed to a forward end of the inner shaft and operatively connected to a lens shifting device (as disclosed in a Japanese patent application laid open under No. 58-202431).

Such a prior art construction has a disadvantage of assembling inconvenience in that after fitting the inner shaft into the hollow shaft the pin must be fixed to the inner shaft with the pin placed in engagement with the groove of the hollow shaft. Furthermore, when the main lens component is shifted forward, the inner shaft is shifted so that a greater part thereof projects from the hollow shaft leaving only a small overlapping between the two shafts. This overlapping part lies in an intermediate position far from the lens drive device in the camera body and the lens shifting device as well. Therefore, the two shafts must be supported with great precision in order to avoid an inclination therebetween which would hamper smooth power transmission.

Furthermore, a bifocal camera wherein an automatic focus adjusting motor is movable in unison with shifting of a main lens component along the optical axis is known, for example, from a Japanese patent application laid open under No. 59-46610. However, this application does not disclose how the motor is connected to an electric circuit fixed to a camera body, leaving room for improvement.

With a camera such as a bifocal camera having a lens shiftable along the optical axis, it is necessary to render a light interrupting structure flexible along the optical axis for preventing entry of harmful light from positions between the movable lens and a photographic aperture.

A known light interrupting structure of this type comprises a flexible bellows mounted between a lens barrel and an exposure aperture (as disclosed in a Japanese utility model application laid open under No. 59-68327). However, the flexible bellows has a considerably large outer diameter when folded, and this permits no other components to be attached adjcent the bellows. Therefore the camera as a whole tends to be bulky presenting a serious problem to compact designing of the camera. Since such a bellows plays no part in attaching security of the lens barrel, some reinforcement must be provided for improved strength.

SUMMARY OF THE INVENTION

A primary object of the present invention is to provide a camera capable of changing focal length and having improved operability.

Another object of the present invention is to provide a camera capable of changing focal length and including a lens drive mechanism of high utility.

A further object of the present invention is to provide a camera of simple and compact construction.

A still further object of the present invention is to provide a camera capable of changing focal length by an easy and smooth operation.

A still further object of the present invention is to provide a camera including a lens barrier of high utility.

Another object of the present invention is to provide a camera wherein devices movable in unison with the main lens component are connected to a circuit in the camera body in a reliable and compact manner.

A further object of the present invention is to provide a camera having a light interrupting structure which is compact and has improved strength.

BRIEF DESCRIPTION OF THE DRAWINGS

The drawings illustrate a bifocal camera embodying the present invention, in which:

FIGS. 5a and 5b are a front view and a perspective view showing a support arrangement for inner and outer light interrupting hollow members, respectively, FIG. 12 is an exploded perspective view of a lens drive mechanism in an automatic focusing device.

DETAILED DESCRIPTION OF THE PREFERRED EMBODIMENTS

Embodiments of the present invention will be described hereinafter with reference to the accompanying drawings.

Figure 1:
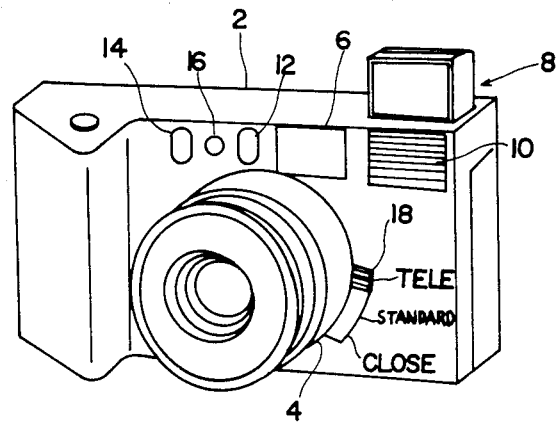
FIG. 1 is a perspective view showing an outward appearance of the camera.

Referring to FIG. 1, a camera 2 comprises a photographic lens assembly 4, a viewfinder window 6, an electronic flash unit 8, a flashlight diffuser 10, a light emitting window 12 of an automatic focus adjusting device, a light receiving window 14 of the automatic focus adjusting device, a meter cell window 16 of an automatic exposure controlling device, and a lever 18 for setting long and short focal distances and for opening and closing a lens barrier.

Figure 2B:
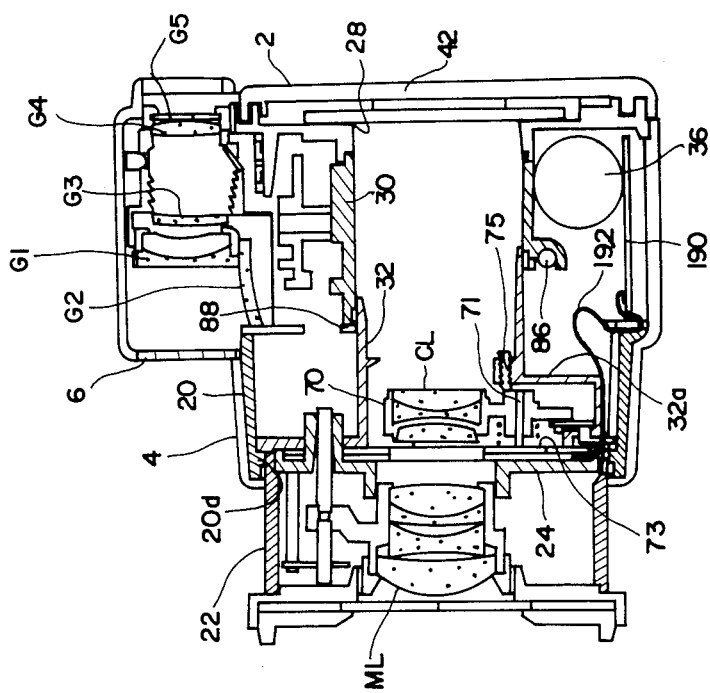
FIGS. 2a and 2b are side views in vertical section of the camera, respectively.
Figure 2A:
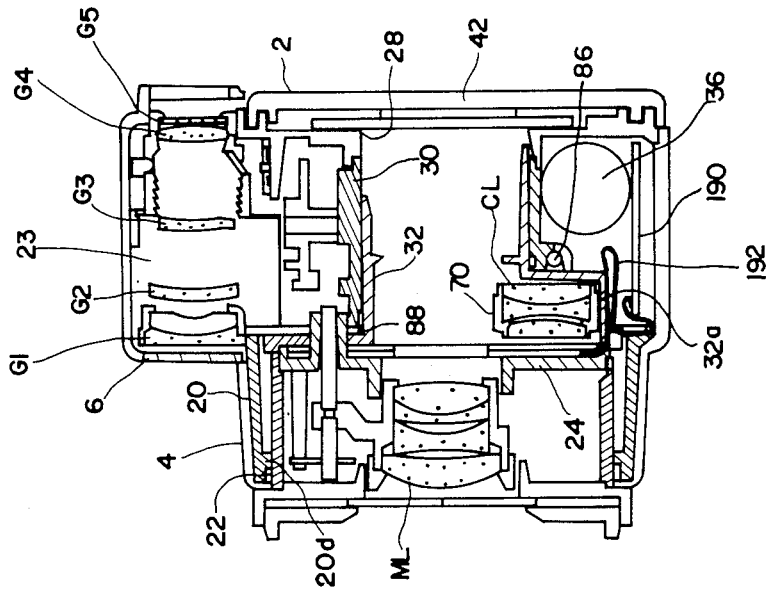

Referring to FIGS. 2a and 2b, the photographic lens assembly 4 includes a fixed lens support barrel 20 fixed to a camera body, and a movable lens support barrel 22 supported by the fixed barrel 20 to be slidable along an optical axis between a protruding position and a contained position. The movable lens support barrel 22 has a main lens component ML constantly located on the optical axis and linked to the automatic focus adjusting device, and a teleconverter auxiliary lens component CL movable between an operative position on the optical axis and a retracted position off a photographic optical path. A photographic lens system of the camera is set for a standard focal length when the movable lens support barrel 22 is in the contained position and the auxiliary lens component CL is in the retracted position as shown in FIG. 2a, and the photographic lens system is set for a long focal length when the movable lens support barrel 22 is in the protruded position and the auxiliary lens component CL is in the operative position.

A viewfinder optical system 23 includes viewfinder lenses G1 to G5 arranged rearwardly of the viewfinder window 6. When the photographic lens system is set for the standard focal length as shown in FIG. 2a, all of the lenses G1 to G5 are located on a viewfinder optical axis for the user to observe a photographed object corresponding to a field angle of the photographic lens system. When the photographic lens system is set for the long focal length as shown in FIG. 2b, the lens G1 is located at a rear position with the lens G2 retracted from a viewfinder optical path of the user to observe a photographed object corresponding to the field angle of the photographic lens system.

Figure 3:
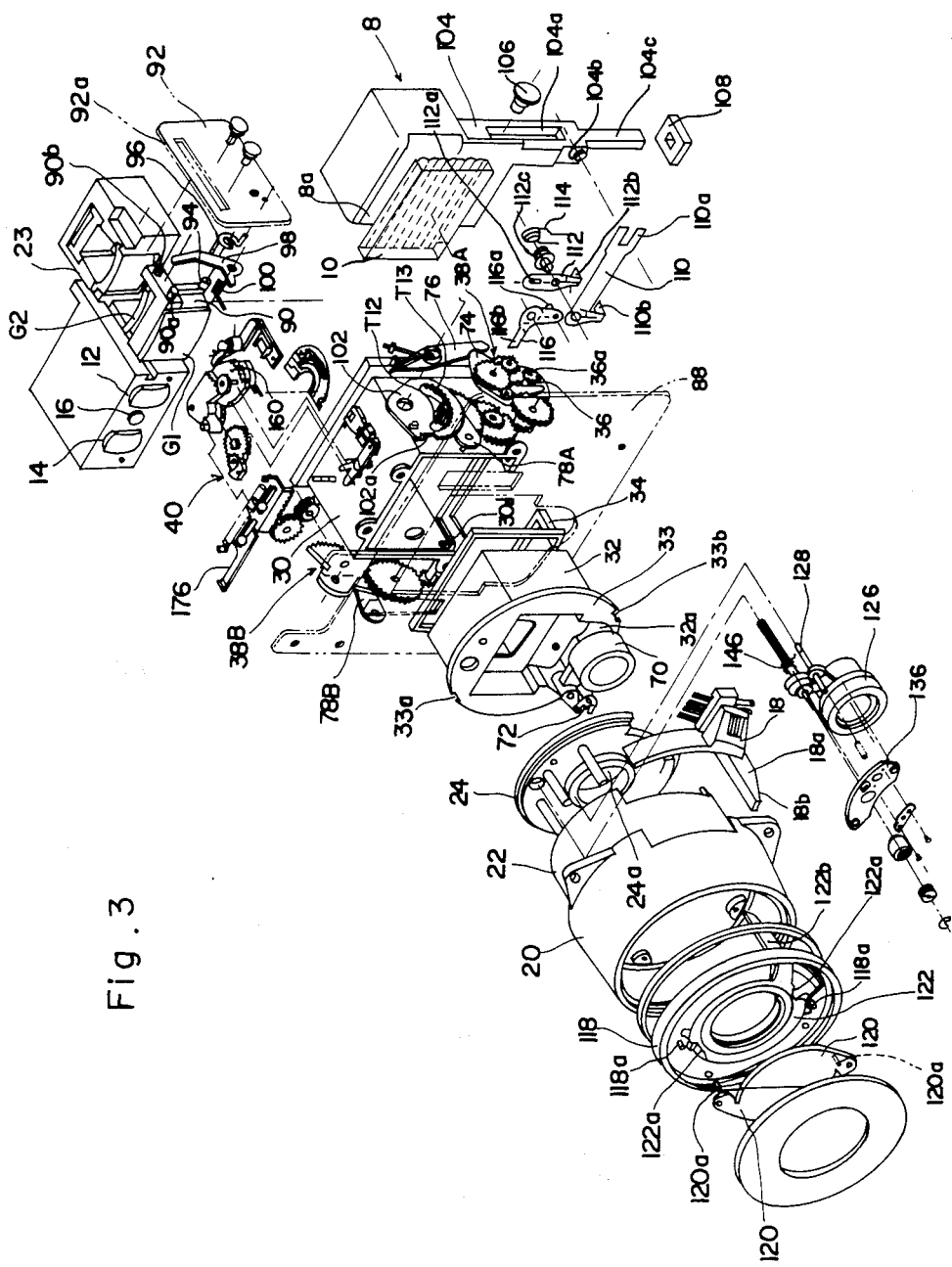
FIG. 3 is an exploded perspective view showing a camera interior.

As shown in FIG. 3, a shutter unit 24 is fixed to the movable lens support barrel 22 with a shutter aperture 24a located rearwardly of the main lens component ML, and is shiftable together with the movable barrel 22 along the optical axis. A lens barrier 120 is supported to be movable between a closed position to cover a front face of the main lens component ML and an open position retracted from the closed position.

Figure 4:
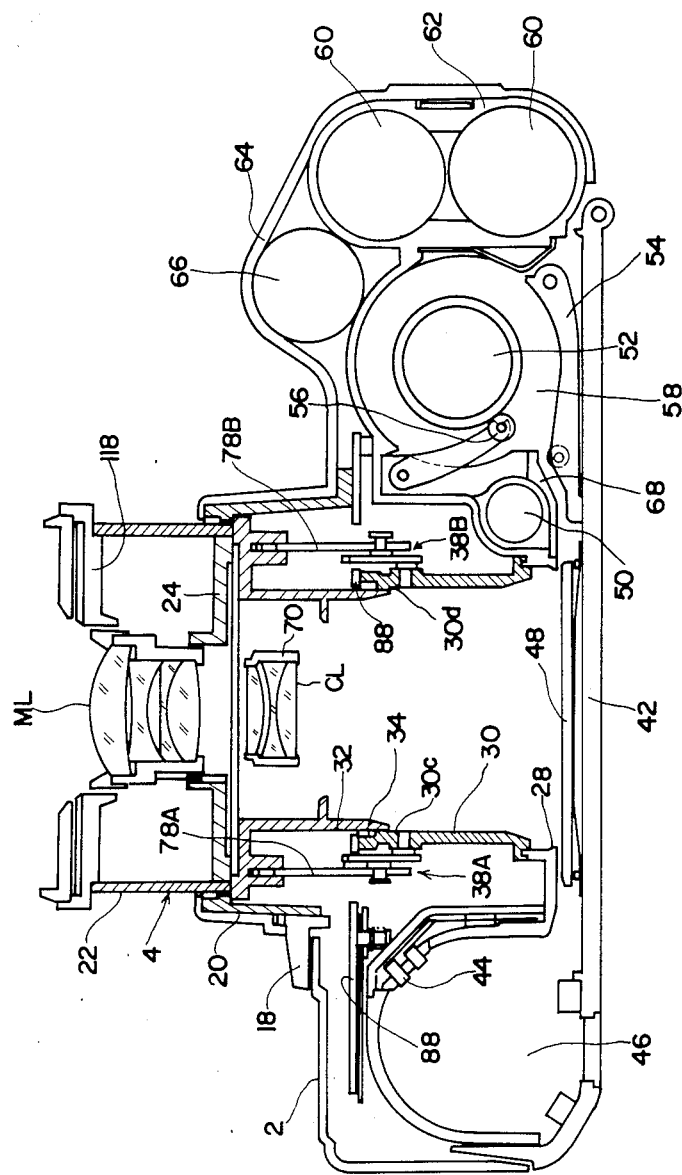
FIG. 4 is a plan view in cross section of the camera.

Referring to FIGS. 2 through 4, there are provided forwardly of an exposure aperture 28 a light interrupting outer hollow member 30 having a rectangular section and fixed to the main body of the camera 2 and a light interrupting inner hollow member 32 having a rectangular section and an outer peripheral wall loosely fitted in an inner peripheral wall of the outer hollow member 30 and a front end connected to the movable lens support barrel 22. The two hollow members 30 and 32 are provided to protect a film loaded in the camera from any harmful light entering the camera body.

Figure 5A:
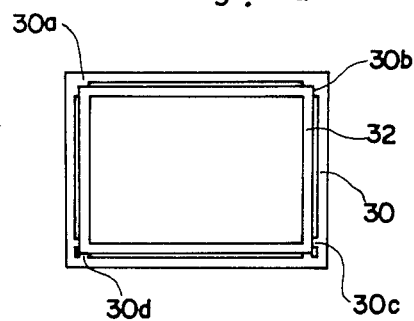

As shown in FIG. 5a and 5b, the outer hollow member 30 defines support projections 30a to 30d extending parallel to the optical axis in corners of the inner peripheral wall thereof to support and guide the corners of the outer peripheral wall of the inner hollow member 32. The outer hollow member 30 has a curtain 34 extending all round a front inner periphery thereof to interrupt light entering through contact portions between the outer hollow member 30 and the inner hollow member 32. The inner hollow member 32 defines a lens pocket 32a in a bottom portion thereof to accommodate the auxiliary lens component CL in the retracted position.

An S-T switching motor 36 is mounted below the light interrupting outer hollow member 30 to cause the shifting of the movable lens support barrel 22 along the optical axis, the movement of the auxiliary lens component CL, switching of the field angle for the viewfinder optical system 23, the opening and closing of the lens barrier 120, and vertical movement of the flash 8. Gear mechanisms 38A and 38B including the lens drive mechanisms are mounted on opposite sides of the light interrupting outer hollow member 30 to transmit power of the motor 36 to the movable lens support barrel 22 to shift the main lens component along the optical axis. These gear mechanisms 38A and 38B tranmit the power of the motor 36 also to the viewfinder optical system 23 and the flash head 8a. A lens drive control mechanism 40 in the automatic focus adjusting device is mounted above the light interrupting outer hollow member 30.

Referring to FIG. 4, the camera 2 comprises a back lid 42, a cartridge chamber 46 including an information readout contact 44 for reading film sensitivity information (camera sensing code) provided on a film cartridge, a pressure plate 48, a sprocket 50, a spool chamber 58 including a spool 52, an inside lid 54 and a film press roller 56, a battery chamber 62 for accommodating two batteries 60, and a main condenser 66 of the flash unit disposed inside an outer wall 64 defining a handgrip forwardly of the spool chamber 58. A film guide 68 extending from a position adjacent a righthand end of the exposure aperture 28 in FIG. 4 through a positon behind a cylindrical portion of the sprocket shaft 50 to an inlet of the spool chamber 58 is formed integral with bearings rotatably supporting the film press roller 56.

Figure 8A:
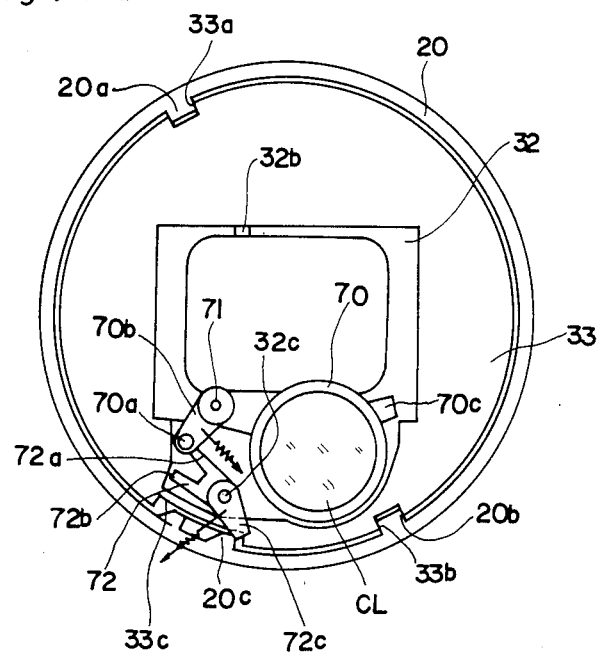
FIGS. 8a and 8b are rear views showing action of an auxiliary lens component, respectively.
Figure 8B:
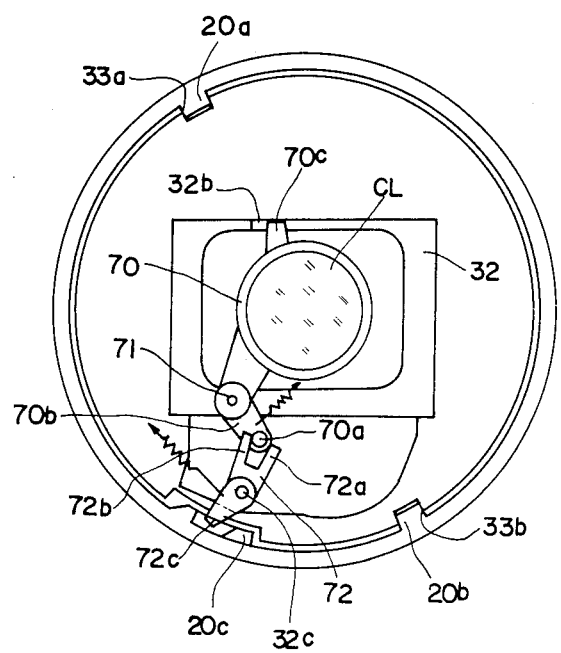

Referring to FIGS. 3, 8a and 8b, the fixed lens support barrel 20 defines a teleconverter actuating cam 20c in form of a helical projection. The light interrupting inner hollow member 32 has a front flange 33 loosely fitted into an inner wall of the fixed barrel 20 and defining key grooves 33a and 33b in engagement with straight keys 20a and 20b and a cutout recess 33c to avoid contact with the actuating cam 20c. Thus, the light interrupting inner hollow member 32 is slidable in the fixed lens support barrel 20 along the optical axis but is held against rotation about the optical axis.

An auxiliary lens support member 70 securely supporting the auxiliary lens component CL includes a projection 70c and an arm 70b having a pin 70a. The support member 70 is supported by the shutter unit 24 to be pivotable on an axis 71 between the operative position extending into the photographic optical path as shown in FIG. 8b and the retracted position off the photographic optical path as shown in FIG. 8a. The support member 70 is urged toward the operative position by a spring. The projection 70c is adapted to contact a stopper 32a provided on the light interrupting inner hollow member to determine the operative position of the auxiliary lens component CL. A switch lever 72 includes a bifurcate arm having legs 72a and 72b and an arm 72c in engagement with the teleconverter actuating cam 20c. The switch lever 72 is supported to be pivotable on an axis 32c attached to the light interrupting inner hollow member 32 and is urged by a spring in clockwise direction in the drawings, with the arm 72c in resilient engagement with the cam 20c.

When the light interrupting inner hollow member 32 is shifted to the rear position, the arm 72c is pressed by the cam 20c and this causes the switch lever 72 to pivot in counterclockwise direction against the urging force and causes the leg 72a to push the pin 70a as shown in FIG. 8a. Thus the auxiliary lens component CL pivots in the clockwise direction against the urging force to be retained in the retracted position. At this time, the leg 72a of the switch lever 72 has an extreme end abutting on the pin 70a and a direction of movement of the pin 70a substantially agrees with a direction of a line linking the pin 70a and the axis 32c, whereby the switch lever 72 acts as a prop against a counterclockwise pivoting of the auxiliary lens component CL. Therefore, the auxiliary lens component CL will not readily move into the photographic optical path in the event of vibrations or shocks.

When the light interrupting inner hollow member 32 shifts forward from the position of FIG. 8a to a protruded position, an abutting position of the cam 20c with respect to the arm 72c of the switch lever 72 changes and this causes the switch lever 72 to pivot in the clockwise direction under the urging force and the pin 70a to follow the leg 72a whereby the auxiliary lens component CL pivots in the counterclockwise direction under the urging force. In the long focal distance state where the light interrupting inner hollow member 32 has reached the protruding position as shown in FIG. 8b, the projection 70c is in contact with the stopper 32b. The leg 72b of the switch lever 72 pushes the pin 70a by virtue of the urging force acting on the switch lever 72 and, together with the urging force acting on the auxiliary lens component CL per se, retains the auxiliary lens component CL in the operative position. Therefore, the auxiliary lens component CL will never leave the operative position in the event of vibrations or shocks. Since according to this embodiment the cam is not provided directly on the pivotable support member 70 of the auxiliary lens component CL, there is no possibility of an undue force acting on the auxiliary lens component CL to deteriorate its positional precision.

Conversely to the described construction, the pivotable support member 70 of the auxiliary lens component CL may be urged toward the retracted position by a spring and may be pivoted to the operative position by a forward shifting of the light interrupting inner hollow member 32.

The auxiliary lens support member 70 is slidable along the optical axis relative to the axis 71 attached to the shutter unit 24 and is rearwardly urged by a spring 73 into resilient engagement with a forward end of an adjustment screw 75 fitted into the light interrupting inner hollow member 32. Thus, by turning the screw 75, the auxiliary lens support member 70 is moved along the optical axis relative to the shutter unit 24 and the inner hollow member 32 to adjust a back focal distance of the photographic lens system.

The back focal distance of the photographic lens system may be adjusted by a very simple and compact construction where, as in the described embodiment, means for adjusting the position of the auxiliary lens component along the optical axis is provided adjacent the pivotal axis of the auxiliary lens support member 70.

Figure 6A:
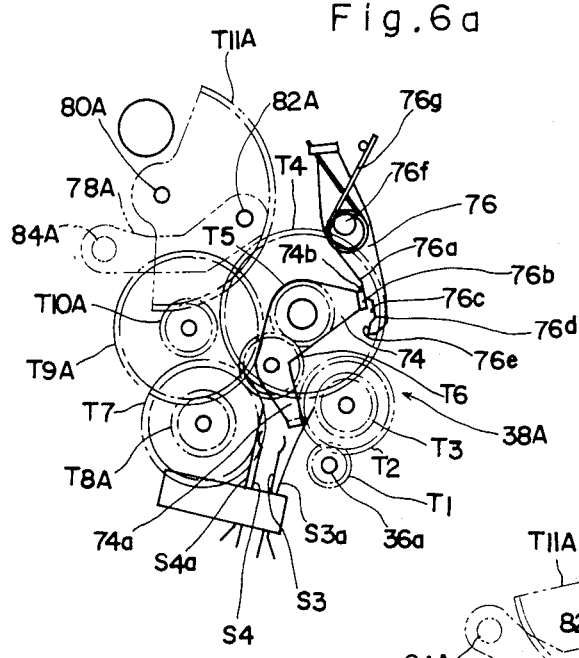
FIGS. 6a through 6c are views showing action of a gear mechanism, respectively.
Figure 6B:
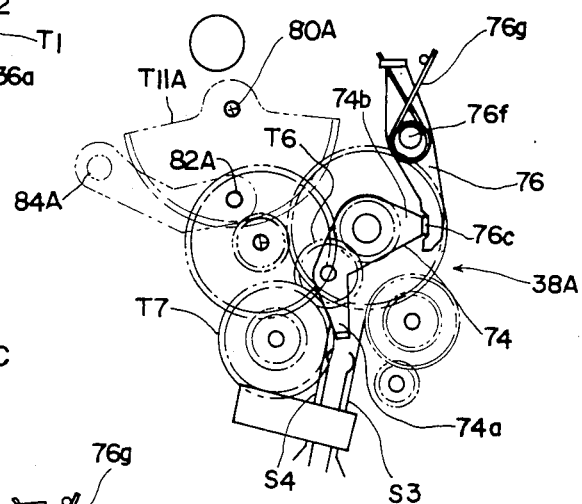
Figure 6C:
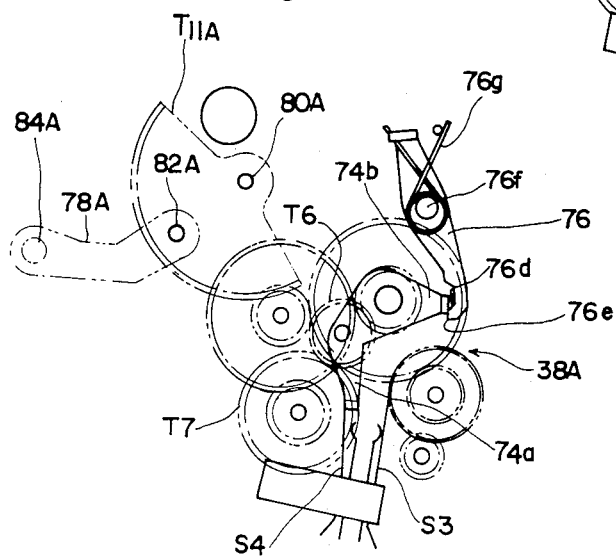

FIGS. 6a, 6b and 6c show how the gear mechanism 38A operates. The S-T switch motor 36 has a rotary shaft 36a carrying a gear T1 fixed thereto. Rotation of the gear T1 is transmitted in a reduced rate through a gear T2 and a gear T3 integral with each other and through a gear T4 and a gear T5 also integral with each other to a gear T6. The gear T6 is supported by an arm 74a of an overload detecting lever 74 pivotably supported by a rotary shaft of the gears T4 and T5. This construction forms a planetary gear mechanism with the gear T5 acting as sun gear. The arm 74a of the overload detecting lever 74 has an extreme end thereof disposed between movable contacts S3a and S4a of normally closed switches S3 and S4. The overload detecting lever 74 has a further arm 74b in engagement with a load lever 76. The load lever 76 comprises a cam including a flat portion 76a, an inclined portion 76b, a flat portion 76c, an inclined portion 76d and a flat portion 76e. The load lever 76 is pivotably supported by an axis 76f and is urged by a spring 76g in the clockwise direction in the drawings so that the cam is in constant, resilient engagement with an extreme end of the arm 74b of the overload detecting lever 74.

The rotation of the gear T6 is transmitted in a reduced rate through a gear T7 and a gear T8A integral with each other and through a gear T9A and a gear T10A also integral with each other to a sector gear T11A. A lens drive lever or link 78A has one end connected to an axis 82A attached to the sector gear T11A and the other end connected to an axis 84A attached to the light interrupting inner hollow member 32.

More particularly, the sector gear T11A acting as a pivotable member is pivotally connected through the lens drive lever 78A to the inner hollow member 32 which is shiftable along the optical axis in unison with a main lens support member 126. Thus a crank mechanism is formed with the pivotable member acting as a crank for shifting the main lens support member 126 along the optical axis. As described, the sector gear T11A acting as the pivotable member receives the power of the motor 36 in a reduced rate.

A further gear mechanism 98B is provided on the other side of the light interrupting outer hollow member 30. This gear mechanism 98B has an arrangement corresponding to the arrangement of the gears T8A, T9A and T10A, the sector gear T11A, and lens drive lever 78A. The gear mechanism 98B operates as does the gear mechanism 38A since the gear mechanism 98B comprises a gear T8B, a gear T9B, unillustrated gears, a sector gear T11B and a lens drive lever 78B corresponding to the gears T8A, T9A, T10A and T11A and the lens drive lever 78A, respectively, with the gear T8B connected with the gear T8A through a shaft 86.

Figure 7:
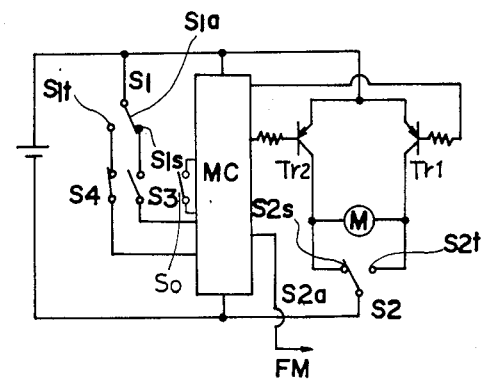
FIG. 7 is a view of an S-T switching motor drive circuit.

FIG. 7 shows a drive circuit for the S-T switch motor 36. In FIG. 7, a circuit MC controls rotation of a motor M, and outputs a "Low" signal to a base of a transistor Tr1 when a contact S1a engages a point S1s and the switch S3 is closed and to a base of a transistor Tr2 when the contact S1a 1 engages a point S1t and the switch S4 is closed.

The switches S1 and S2 are switchable by the setting lever 18 shown in FIG. 1. When the lever 18 is in a position to set the long focal length (the position marked "TELE" in FIG. 1), the contacts S1a and S2a engage the points S1t and S2t, respectively. When the lever 18 is in a position to set the standard focal length or a position to close the lens barrier (the position marked "STANDARD" or the position marked "CLOSE" in FIG. 1), the contacts S1a and S2a engage the points S1s and S2s respectively.

The lever 18 acts also as an electric source switching member. When the lever 18 is in the position marked "CLOSE", power supply for each device is cut whereas, when the lever is in the other positions, power is supplied to each device.

A switch So is closed when the lever 18 is in the position marked "STANDARD" or the position marked "TELE" and is opened when the lever 18 is in the position marked "CLOSE". Power supply for the circuit MC is stopped several seconds after the opening of the switch So, the several seconds being a sum of a time necessary for switching between the standard focal length state and the long focal length state and a certain safety time. Since the power supply is maintained for several seconds after the opening of the switch So as described above, the motor M is kept in operation until all the elements are switched even if the lever 18 is rapidly moved from the "TELE" position to the "CLOSE" position.

The switches S3 and S4 are the normally closed switches shown in FIG. 6 and have the contacts S3a and S4a extending into a path of movement of the arm 74a of the overload detecting lever 74. The switches S3 and S4 are both closed when the overload detecting lever 74 is in an intermediate position shown in FIG. 6b. The switch S3 is opened when the lever 74 pivots in the counterclockwise direction from the intermediate position to a position shown in FIG. 6a. The switch S4 is opened when the lever 74 pivots in the clockwise direction to a position shown in FIG. 6c. The switch motor 36 is connected with the transistors Tr1 and Tr2 and the switch S2. The switch motor rotates in a first direction when the transistor Tr1 is conductive and the contact S2a of the switch S2 engages the point S2s, and in a second direction which is opposite to the first direction when the transistor Tr2 is conductive and the contact S2a engages the point S2s.

Operations of the gear mechanisms 38A, 38B and the switch motor 36 will now be described referring to FIGS. 6 and 7. FIG. 6a shows a position for establishing the standard focal length state (hereinafter referred to as the standard state), in which the sector gear T11A has pivoted in the counterclockwise direction placing the lens drive lever 78A in a rear position (a rightward position in the drawings) and the light interrupting inner hollow member 32 and the movable lens support barrel 22 in the contained position. At this time the motor 36 is stopped since the switch S3 is opened by the counterclockwise pivoting of the overload detecting lever 74 although the contact S1a of the switch S1 is in engagement with the point S1s. The arm 74b of the overload detecting lever 74 is in engagement with the flat portion 76a of the load lever 76. When this state is changed by moving the setting lever 18 to establish the long focal length state, the circuit state shown in FIG. 7 is changed such that the contacts S1a and S2a of the switches S1 and S2 engage the points S1t and S2t, respectively, whereby the transistor Tr2 is conductive to rotate the motor 36 in the second direction.

The above causes the gear T1 to rotate in the counterclockwise direction which in turn causes the gear T5 to rotate in the counterclockwise direction and the gear T6 to revolve in the clockwise direction round the gear T5. As a result, the arm 74b of the overload detecting lever 74 slides down the inclined portion 76b of the load lever 76 and stops at an intermediate position to resiliently engage the flat portion 76c, which retains the gear T6 rotatable in the clockwise direction at a position to be in proper engagement with the gear T7 as shown in FIG. 6b. The rotation of the gear T6 is transmitted to the sector gear T11A whereby the latter pivots in the clockwise direction shifting the lens drive lever 78 to a forward position (a leftward position in the drawings). This causes the light interrupting inner hollow member 32 and the movable lens support barrel 22 to shift to the protruded position. When the inner hollow member 32 and the movable barrel 22 reach the forward protruded position, the front flange 33 of the inner hollow member 32 abuts against a projection 20d provided as one example of restricting means on the inner wall of the fixed lens support barrel 20 as shown in FIG. 2b, thereby stopping a further forward shifting of the inner hollow member 32 and the movable barrel 22. When the forward shifting of the drive lever 78A is stopped, the rotation of gear T7 is stopped by means of the gears between the drive lever 78A and the gear T7. As a result the rotation of gear T6 is stopped and this increases a force to cause the revolution of gear T6 round the gear T5. When the force to cause the revolution of gear T6 exceeds a predetermined value, the overload detecting lever 74 which has been held against a pivotal movement by the cam on the load lever 76 pivots in the clockwise direction with the arm 74b pushing away the inclined portion 76d against the urging force of the spring 76g. The clockwise pivoting of the overload detecting lever 74 moves the arm 74a to open the switch S4 as shown in FIG. 6c, thereby deenergizing the transistor Tr2 and stopping the switch motor 36.

On the other hand, when the setting lever 18 is operated to switch from the position for the long focal length state as shown in FIG. 6c to the position for the standard state, the contacts S1a and S2a of the switches S1 and S2 engage the points S1s and S2s, respectively, thereby rotating the switch motor 36 in the first direction. This causes the gear T1 to rotate in the clockwise direction which in turn causes the overload detecting lever 74 and the gear T6 to assume the position shown in FIG. 6b, whereby the rotation of the switch motor 36 opposite to its rotation in the foregoing situation is transmitted to the sector gear T11A to rotate the latter in the counterclockwise direction. As a result, the lens drive lever 78A shifts backward (rightward in the drawings) shifting the light interrupting inner hollow member 32 and the movable lens support barrel 22 to the rear contained position. When the inner hollow member 32 and the movable barrel 22 reach the contained position, the front flange 33 of the inner hollow member 32 abuts against a front plate 88 provided as an example of the restricting means whereby a further backward shifting of the inner hollow member 32 and the movable barrel 32 is prevented. This stops the rotation of the gear T7 causing the gear T6 to revolve in the counterclockwise direction against the engagement between the arm 74b of the overload detecting lever 74 and the cam of the load lever 76. As a result, the arm 74b moves up the inclined portion 76b into engagement with the flat portion 76a and the arm 76a opens the switch 76a as shown in FIG. 6a thereby stopping the switch motor 36.

Since this gear mechanism 38A comprises a five-step reduction gearing, the sector gear T11A is pivotable with a great strength. Therefore, the shifting of the inner hollow member 32 and the movable lens support barrel 22 can hardly be interrupted halfway. If this shifting should be interrupted halfway by any chance, the switch motor 36 would be stopped as when the hollow member 32 and the barrel 22 reach the protruded position or the contained position, that is to say the rotation of gear T7 is stopped causing the revolution of gear T6 to move the arm 74b of the overload detecting lever 74 up the inclined portion 76b or 76d to the flat portion 76a or 76e and to move the arm 76a to open the switch S3 or S4. Therefore, even when an overload is applied, for example, to the movable lens support barrel 22 to interrupt its shifting, the switch motor 36 will not be stopped rotating while power is supplied thereto and thus an electric current for locking the switch motor 36 will not continue to flow through the motor 36 which would cause its overheating. In order to resume the interrupted shifting, the movable barrel 22 is manually shifted in the direction in which the barrel 22 was shifting prior to the interruption. This causes the gear T7 to rotate, which in turn causes the gear T6 to revolve a slight amount since a rotation of this gear T6 is resisted by a great force due to the engagement of the gears T1 to T6 at rest. This revolution moves the arm 74b of the overload detecting lever 74 from the flat portion 76a or 76e of the load lever 76 down the inclined portion 76b or 76d to reach the flat portion 76c, whereby the switch S3 or S4 which has been opened by the arm 74a is closed and the switch motor 36 is rotated again. In the event that the switch motor 36 is stopped as described above while the setting lever 18 is in the position to establish the long focal length, the lever 18 may be moved to the position to establish the standard focal length once and then back to the position to establish the long focal length.

When the gear mechanism 38A is in the standard state shown in FIG. 6a and in the long focal length state shown in FIG. 6c, the pivotal axis 80A of the sector gear T11A and the axis 82A connecting the lens drive lever 78A to the sector gear T11A are substantially juxtaposed in the axial direction. In other words, the main lens support member 126 is stopped when the crank mechanism substantially reaches a first dead point or a second dead point rotated a half cycle from the first dead point. Therefore, even when the movable barrel 22 or other member receives a force to shift it along the optical axis from the state shown in FIG. 6a or FIG. 6c, such a force has a short line of action to pivot the sector gear T11A and hence a small torque. On the other hand, a great torque is required for pivoting the sector gear T11A since the gears T10A to T1 connected thereto act as an accelerating or multiplying gear mechanism. Thus there occurs no inadvertent axial shifting of the movable barrel 22 due to a push applied thereto.

While in the described embodiment an overload acting on the motor is detected mechanically, the overload detecting means may include a timer operable on detection of an interruption in the shifting of the main lens component, an overload being noted when its time count reaches a predetermined value. The interruption may be detected by an encoder adapted to produce a pulse signal corresponding to an amount of shifting of the main lens component, whereby the interruption is noted when count of its pulses is discontinued.

Referring to FIG. 3, a holder 90 supporting the lens G1 of the viewfinder optical system has pins 90a and 90b integral therewith and extending into an elongate groove 92a defined in a side plate 92 so that the holder 90 is shiftable along the optical axis of viewfinder with the pins 90a and 90b guided by the elongate groove 92a. The lens G2 is supported to be pivotable on an axis 94 between an operative position in a viewfinder optical path and a retracted position off the viewfinder optical path. The lens G2 is urged by a spring 96 to the operative position which is set by an abutment of the lens G2 against a rear face of the holder 90. A viewfinder switch lever 98 is pivotably supported with an extreme end thereof extending into a space between the pins 90a and 90b. When the switch lever 98 pivots in the clockwise direction, its end presses upon the pin 90b to shift the holder 90 to a rear position. When the switch lever 98 pivots in the counterclockwise direction, its end presses upon the pin 90a to shift the holder 90 to a front position. This switch lever 98 is connected to a sector plate 102 through a spring 100. The sector plate 102 has an internal gear T13 engaged with a gear T12 connected to the pivotal axis 80A of the sector gear T11A (FIGS. 6a to 6c) and is supported to be pivotable on an axis common with the switch lever 98.

Pivoting of the sector gear T11A is transmitted to the sector plate 102 through the gear T12 and the internal gear T13, and pivoting of the sector plate 102 is transmitted to the switch lever 98 through the spring 100. When the switch lever 98 pivots in the clockwise direction, the holder 90 is shifted rearward, and the lens G2 pushed by the rear face of the holder 90 is pivoted to the retracted position against the urging force of the spring 96. The sector plate 102 continues pivoting after the lens G2 has reached the retracted position and the holder 90 has reached the rear position with the pin 90b contacting a rear end of the elongate guide groove 92a. An amount of this further pivoting is absorbed by an elastic deformation of the spring 100. At this time the holder 90 is pressed to the rear position by the elastic force of the spring 100, and therefore the holder 90 will not shift from the rear position inadvertently.

On the other hand, when the sector plate 102 pivots in the counterclockwise direction, the holder 90 is shifted forward and the lens G2 pivots following the holder 90 by the urging force of the spring 96. At this time too, the sector plate 102 continues pivoting after the lens G2 has reached the operative position and the holder 90 has reached the front position with the pin 90a contacting a front end of the elongate guide groove 90a, thereby to retain the holder 90 in the front position by the urging force of the spring 100.

FIGS. 3 and 9a through 9d show a mechanism for vertically shifting the flash head 8a of the electronic flash unit.

As seen in FIG. 3, a flash head supporter 104 includes a slot 104a, a pin 104b and a leg 104c below the flash head 8a. The slot 104a is in engagement with a fixed pin 106 and the leg 104c extends into a fixed opening 108. Thus the flash head supporter 104 is shiftable between a lower position to place the flash head behind the fixed flashlight diffuser 10 and an upper position to place the flash head above the flashlight diffuser 10. The light emitting angle of this flash is determined to cover the field angle of the photographic lens assembly in the standard state when the flash head 8a flashes from behind the diffuser 10, and is determined to cover the field angle of the photographic lens assembly in the long focal length state when the flash head 8a flashes from above the diffuser 10. Therefore, the flash head supporter 104 is shifted to the lower position for the standard state and to the upper position for the long focal length state.

A lift lever 110 has bifurcate arms 110a opposed to each other across the pin 104b of the flash head supporter 104 and an arm 110b, and is pivotable on an axis 112c together with a lever 112 having a slot 112a and an arm 112b. The lift lever 110 and lever 112 normally are pivotable in unison with each other with the arms 110b and 112b having coil portions inserted into a torsion coil spring 114 attached to the axis 112c. A lever 116 has a pin 116a extending into the slot 112a of the lever 112 and an arm 116b in engagement with a recess 102a defined in the sector plate 102, and is pivotable on an axis 116c.

Figure 9A:
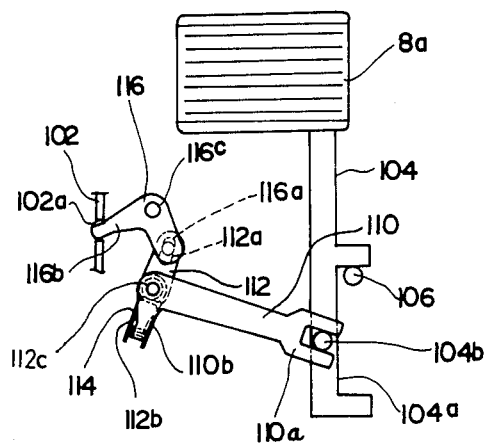
FIGS. 9a through 9d are front views showing a device for vertically moving an electronic flash unit, respectively.
Figure 9C:
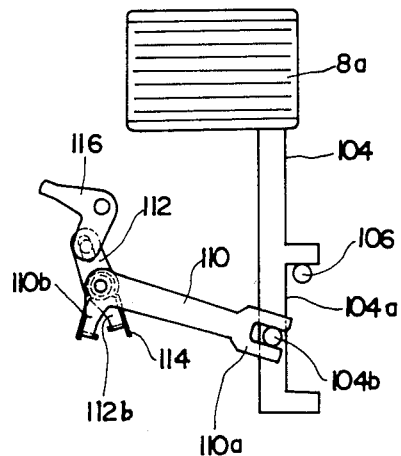
Figure 9B:
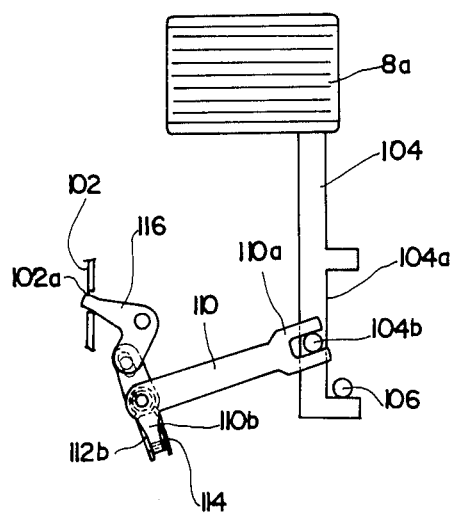

In the standard state the arm 116b of the lever 116 is retained in a lower position by the sector plate 102, and the flash head supporter 104 has been placed in the lower position by a clockwise pivoting of the lever 112 and the lift lever 110. When switching from this state to the long focal length state, the sector plate 102 pivots in the clockwise direction in FIG. 3 with the recess 102 moving upward. This causes the lever 116 to pivot in the clockwise direction, which in turn causes the lever 112 and lift lever 110 to pivot in the counterclockwise direction by means of the engagement between the pin 116a and the slot 112a and the flash head supporter 104 to shift to the upper position by means of the engagement between the arm 110a and the pin 104b, as shown in FIG. 9b. When the sector plate 102 is pivoted in the counterclockwise direction in FIG. 3 lowering the recess 102a for switching from the long focal length state to the standard state, the levers 116, 112 and 110 pivot to shift the flash head supporter 104 to the lower position as shown in FIG. 9a.

Figure 9D:
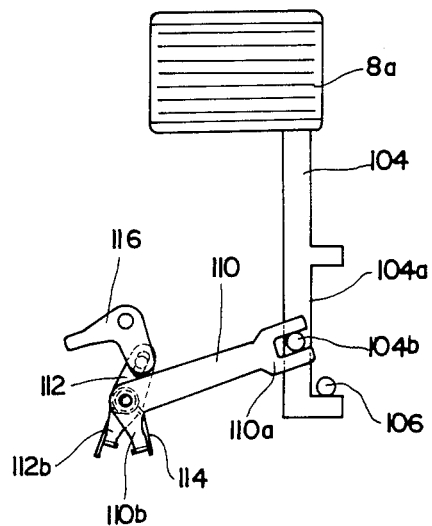
Figure 10:
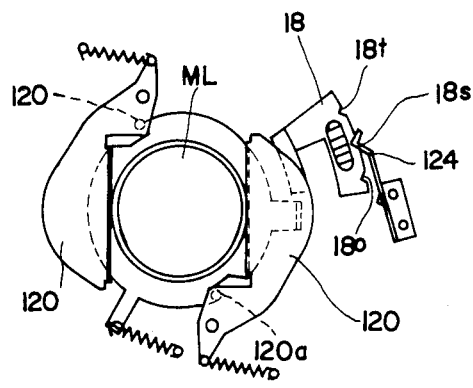
FIG. 10 is a front view of a lens barrier.

With the described mechanism for vertically shifting the flash head, when the upward shifting of the flash head supporter 104 is interrupted by an undue force or when the flash head supporter 104 in the upper position shown in FIG. 9b is depressed, the lift lever 110 is stopped halfway in its pivotal movement or is pivoted in the clockwise direction. However, the levers 116 and 112 will operate properly with only the spring 114 becoming elastically deformed as shown in FIG. 9c. Therefore, upon removal of the undue force acting on the flash head supporter 104 the spring 114 returns to an original state and the flash head supporter 104 shifts to the normal upper position. A similar function takes place when the downward shifting of the flash head supporter 104 is interrupted or when the flash head supporter 104 in the lower position shown in FIG. 9d is pulled upward. An improper operation of the lift lever 110 resulting therefrom is absorbed by an elastic deformation of the spring 114 thereby maintaining the levers 112 and 116 and the sector plate 102 in proper operation, and upon removal of such an undue force the flash head supporter 104 shifts to the lower position. For both standard state and the long focal length state the lever 112 is pivotable exceeding an amount determined by the slot 104a as necessary for the shifting of the flash head supporter 104. This additional amount of pivoting is absorbed by the spring 114, whereby the flash head 8a is pressed downward in the standard state and is pressed upward in the long focal length state.

Referring to FIG. 3, a barrier support plate 118 is fixed to a front end of the movable lens support barrel 22. The lens barrier 120 has pins 120a on a rear face thereof and is supported by axes 118a of the support plate 118 to be pivotable between a closed position to cover a front face of the main lens component ML and an open position to expose the front face of the main lens component ML. A barrier operator plate 122 has recesses 122a in engagement with the pins 120a of the lens barrier 120 and a leg 122b extending rearwardly therefrom to act as a first control member. The barrier operator plate 122 is supported by the support plate 118 to be pivotable on the optical axis and is urged in the counterclockwise direction in FIG. 3, namely in a direction to push the lens barrier 120 to the open position by means of the engagements between the recesses 122a and the pins 120a. The setting lever 18 described hereinbefore acts as a second control member to control the leg 122b. The setting lever 18 is supported by the fixed barrel 20 to be pivotable on the optical axis and has contacts constituting the switches S1 and S2 and an inclined leg 18a.

Figure 11A:
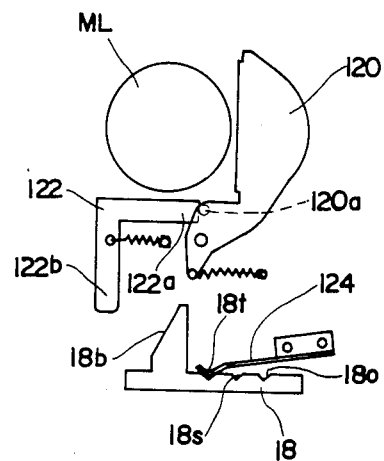
FIGS. 11a through 11c are front views showing action of the lens barrier, respectively.
Figure 11B:
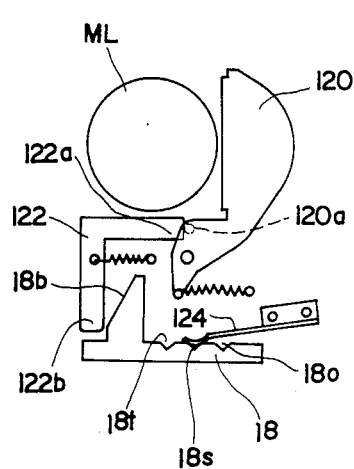
Figure 11C:
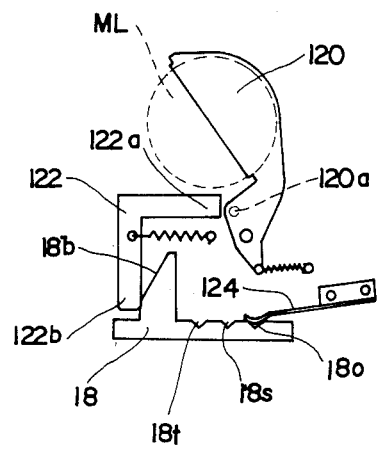

FIGS. 10 and 11a through 11c schematically show exploded views of operative positions of the lens barrier 120, barrier operator plate 122 and setting lever 18, FIGS. 11a through 11c showing only one half of the lens barrier 120. The setting lever 18 is acted on by a click mechanism comprising a leaf spring 124 and cutouts 18o, 18s and 18t. The leaf spring 124 is adapted to click into the cutouts 18t, 18s and 18o, respectively, to establish the long focal length state and the standard state and to retain the lens barrier in the closed position. In the long focal length state and the standard state shown in FIGS. 11a and 11b, the leg 122b of the operator plate 122 is out of engagement with the inclined leg 18a of the setting member 18, and the urging force acting on the operator plate 122 overcomes the urging force acting to close the lens barrier 120 whereby the lens barrier 120 is retained in the open position. When switching from the standard state shown in FIG. 11b to the barrier closing state, a root portion of the inclined leg 18a of the setting lever 18 pushes the leg 122b of the operator plate 122 leftward in the drawings against the urging force whereby the barrier 120 shifts to the closed position under the urging force to close the barrier 120.

On the other hand, when switching from the long focal length state shown in FIG. 11a to the barrier closing state, the barrier 120 remains open immediately after the switching since the operator plate 122 still is in a forward position (an upward position in the drawing) out of engagement with the inclined leg 18a. Then as the movable barrel 22 shifts backward, the operator plate 122 shifts backward (downward in the drawing). The inclined leg 18a defines a cam surface 18b inclined relative to the optical axis, and this cam surface 18b pushes the leg 122b as a result of the backward shifting of the operator plate 122. The leg 122b thus pushed moves leftward in the drawings permitting the barrier 120 to pivot to the closed position.

Figure 13:
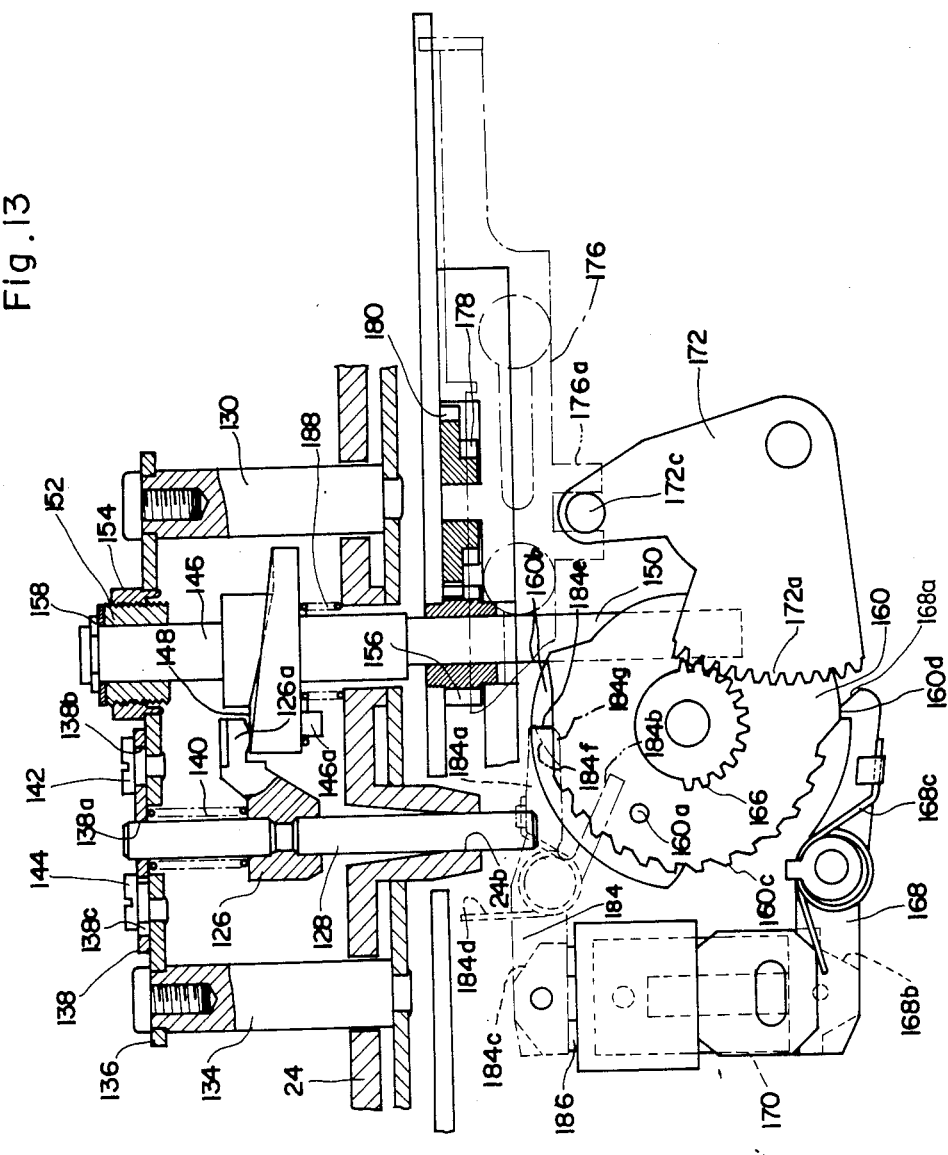
FIG. 13 is a plan view of the lens drive mechanism.
Figure 14:
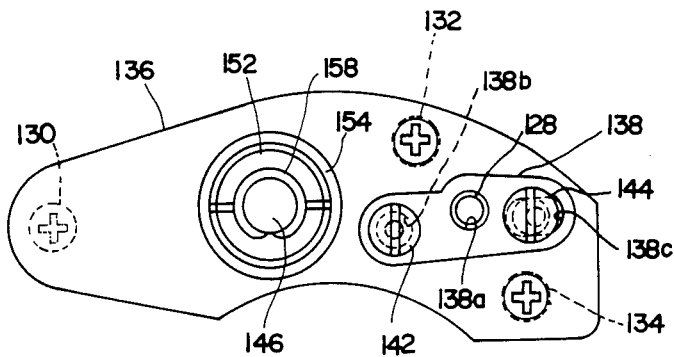
FIG. 14 is a front view of a principal portion of the lens drive mechanism.

FIGS. 12 through 14 show a lens drive arrangement in the automatic focus adjusting device.

The main lens support member 126 securely supporting the main lens component ML is integrally provided with a slide rod 128 extending parallel to the optical axis of the main lens component ML and a projection 126a. The slide rod 128 extends through a rod receiving opening 24b defined in the shutter unit 24 and a rod receiving opening 138a defined in an adjusting plate 138 on a fixed plate 136 connected to the shutter unit 24 by means of support rods 130, 132 and 134. Thus the slide rod 128 is slidable along the optical axis and is urged backward by a spring 140. As shown in FIG. 14, the adjusting plate 138 defines, in addition to the rod receiving opening 138a, a circular opening 138b and an elongate opening 138c substantially along a normal line extending from a center of the circular opening 138b, and is supported by eccentric pins 142 and 144. The adjusting plate 138 is oscillatable about the circular opening 138b by turning the eccentric pin 142, and is oscillatable sliding the elongate opening 138c and the eccentric pin 122 when the eccentric pin 144 is turned. The operation effects positional adjustment of a forward end of the slide rod 128 thereby adjusting an inclination with respect to the camera body of the optical axis of the main lens component ML.

A cam shaft 146 includes a focusing cam 148 with a height variable in the direction parallel to the optical axis according to its rotational positions, and a spline shaft 150. The cam shaft 146 is rotatably supported parallel to the optical axis by a back focal distance adjusting bolt 152 secured to the fixed plate 136, a nut 154 screwed to the bolt 152, and a gear 156 fitted on the spline shaft 150 at a rear end of the cam shaft 146 and rotatably supported by the camera body. The cam shaft 146 is also slidable along the optical axis relative to the gear 156. The cam shaft 146 is retained in a position to keep a ring 158 abutting on a front face of the bolt 152 since the focusing cam 146 abuts on the projection 126a of the main lens holder 126 urged backward by the spring 140. In an initial state the cam shaft 146 is in a rotational position with a high portion of the focusing cam 148 abutting on the projection 126a of the support member 126, and in this state the main lens component ML is in a foremost position which is slightly forward of a focusing positioning for extreme closeup shot. As the cam shaft 146 rotates, the projection 126 engages lower portions of the focusing cam 148 withdrawing the main lens component ML for progressively long distance.

Figure 17A:
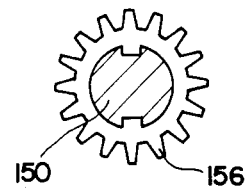
FIGS. 17a and 17b are sectional views showing modified examples of interlocking between a transmission shaft and a drive gear, respectively.
Figure 17B:
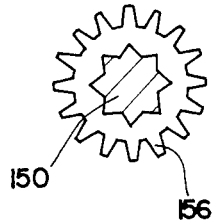

The focusing cam 148 as described above represents an example of driven member shiftable along the optical axis in unison with the main lens component ML, and in this embodiment acts as a lens shifting member for axially shifting the main lens component ML. The spline shaft 150 acts as a transmission shaft for transmitting drive from the drive gear 156 to the focusing cam 148. Instead of the spline connection between the transmission shaft 150 and the drive gear 156, other structures may be employed wherein the transmission shaft 150 has a varied diameter construction and the drive gear 156 has a shape corresponding thereto. FIG. 17a shows an example comprising two keys and grooves, and FIG. 17b shows another example comprising a star shaped construction.

The adjusting bolt 152 is for adjusting the back focal distance of the lens assembly. When turned the bolt 152 shifts along the optical axis by virtue of its screw engagement with the nut 154, which shifts the cam shaft 146 along the optical axis through the ring 158 thereby shifting the main lens component ML along the optical axis to adjust the back focal distance.

In this construction, the shutter unit 24, fixed plate 136, slide rod 128 and cam shaft 146 shift with the shifting of the movable barrel 22 along the optical axis. As opposed to this, the gear 156 supported by the camera body does not shift along the optical axis and is connected to a lens drive mechanism to be described later. The spline shaft 150 of the cam shaft 146 retains the connection with key grooves 156a defined in the gear 156 wherever the spline shaft 150 moves along the optical axis. Therefore rotation of the gear 156 is transmitted to the cam shaft 146 regardless of the position of the movable barrel 22 or whether in the standard state or in the long focal length state.

Referring to FIG. 12, a fixed portion in the camera body rearwardly of the shutter unit 24 has a focusing mechanism operable to rotate the cam shaft 146 to a position corresponding to an output of a range finder device and to stop the cam shaft 146 at that position.

A passive gear 160 comprises a passive gear portion 160c, a contact 164 slidable on an encoder pattern 162 provided on a substrate, a gear portion 166, a charge pin 160a and a passive projection 160b. A stopper lever 168 comprises a claw 168a engageable with the passive gear portion 160c, a contact piece 168b adapted to be drawn by a lens stop magnet 170. The stopper lever 168 is pivotable between an engaging position with the contact piece 168b released from the magnet 170 and the claw 168a engaging the passive gear portion 160c and a drawn position with the contact piece 168b drawn to the magnet 170 and the claw 168a out of engagement with the gear portion 160c. The stopper lever 168 is urged to the engaging position by a spring 168c. In the initial state the stopper lever 168 is retained in the drawn position against the urging force of the spring 168c since the claw 168a is pushed by a cam 160d of the passive gear 160.

A connecting gear 172 comprises a sector gear 172a engageable with the gear portion 166, a gear 172b and a connector pin 172c, all integral with the connecting gear 172, the gear 172b being connected to a governor mechanism 174. A drive plate 176 comprises a fork 176a in engagement with the connector pin 172c, and a rack 176b connected to the gear 156 through gears 178 and 180. The drive plate 176 is supported to be transversely movable and is urged leftward in FIG. 12 by a drive spring 182. The drive plate 176 is linked to a film winding mechanism of the camera, and is pushed rightward in the drawing as a film winding action takes place.

A release lever 184 comprises an engaging arm 184a engageable with the passive projection 160b of the passive gear 160, an elastic arm 184b and a contact piece 184c. The release lever 184 is pivotable between a drawn position with the engaging arm 184a engaging the passive projection 160d and the contact piece 184c drawn by a release magnet 186, and a release position with the contact piece 184c released from the release magnet 186 and the engaging arm 184a out of engagement with the passive projection 160b. The release lever 184 is urged to the release position by a spring 184d. The release magnet 186 comprises a combination of a permanent magnet and an electromagnet to cancel a magnetic field of the permanent magnet. In the initial state the release magnet 186 attracts and holds the contact piece 184c. As shown in FIG. 13, the engaging arm 184a of the release lever 184 has an engaging projection 184g defining an engaging surface 184e substantially perpendicular to a direction of pivoting of the projection 160b of the passive gear 160 and an inclined surface 184f inclined with respect to the direction of pivoting. In the initial state the engaging surface 184e engages the projection 160b against the urging force of the drive spring 182. In the event that the release lever 184 is in the drawn position when the passive gear 160 is charged from an operative position to the initial position, the projection 160b pivots in the clockwise direction in the drawing pushing the inclined surface 184f to withdraw the contact piece 184c from the release magnet 186 once and retract the release lever 184 from the drawn position. Therefore, the release lever 184 is retained in the drawn position by the magnet 186 and does not prevent the passive gear 160 from returning to the initial position even if the engaging projection 184g lies in a path of movement of the projection 160b. This eliminates possibility of damage to these mechanisms occurring at charging times. The release lever 184 retracted from the initial position once as described above is moved to the drawn position with the elastic arm 184b pushed by the charge pin 160a when the passive gear 160 is overcharged further from the initial position in the clockwise direction in the drawing. At this time, the pin 160a pushes the elastic arm 184b of the release lever 184 having reached the drawn position and moves it in the counterclockwise direction in the drawing, but this movement is absorbed by a deformation of the elastic arm 184b.

A spring 188 mounted on the cam shaft 146 has one end thereof fixed to the shutter unit 24 and the other end connected to a pin 146a of the cam shaft 146. The spring 188 urges the cam shaft 146 from a position corresponding to a nearest focusing position to a position corresponding to an infinite focusing position. This eliminates backlashes among the spline shaft 150, key grooves 156a, gear 156, gear 180 and gear 178, and operational errors occurring between the cam shaft 146 and the drive plate 176.

Figure 15A:
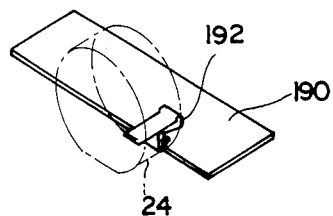
FIGS. 15a and 15b are perspective views of a flexible printed board as attached.
Figure 15B:
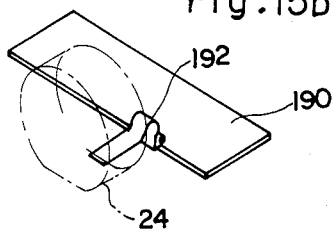

The shutter unit 24 includes shutter blades also acting as an aperture diaphragm and a pulse motor for opening and closing the shutter blades. The shutter unit 24 is electrically connected through a flexible printed board 192 in band form to a circuit board 190 having an exposed control circuit for driving the pulse motor, as shown in FIGS. 2a, 2b, 15a and 15b. The printed board 192 is disposed below the pocket 32 defined in the light interrupting inner hollow member 32 for accommodating the auxiliary lens component CL. In the standard state, the printed board 192 is folded below the pocket 32a as shown in FIGS. 2a and 15a. In the long focal length state, a folded portion of the printed board 192 is stretched and projects in a shape of letter U into a space occupied by the pocket 32 during the standard state, as shown in FIGS. 2b and 15b. With this construction the printed board 192 only deforms to the loosely folded position and the position with the folded portion slightly stretched in the standard and long focal length states, and therefore the deformations will not cause any line breaks or other damage. Furthermore, since the U-shaped slack portion formed in the long focal length state is accommodated in the space from which the pocket 32a for the auxiliary lens component CL has moved away, this construction requires no special space for accommodating the slack portion.

Figure 16:
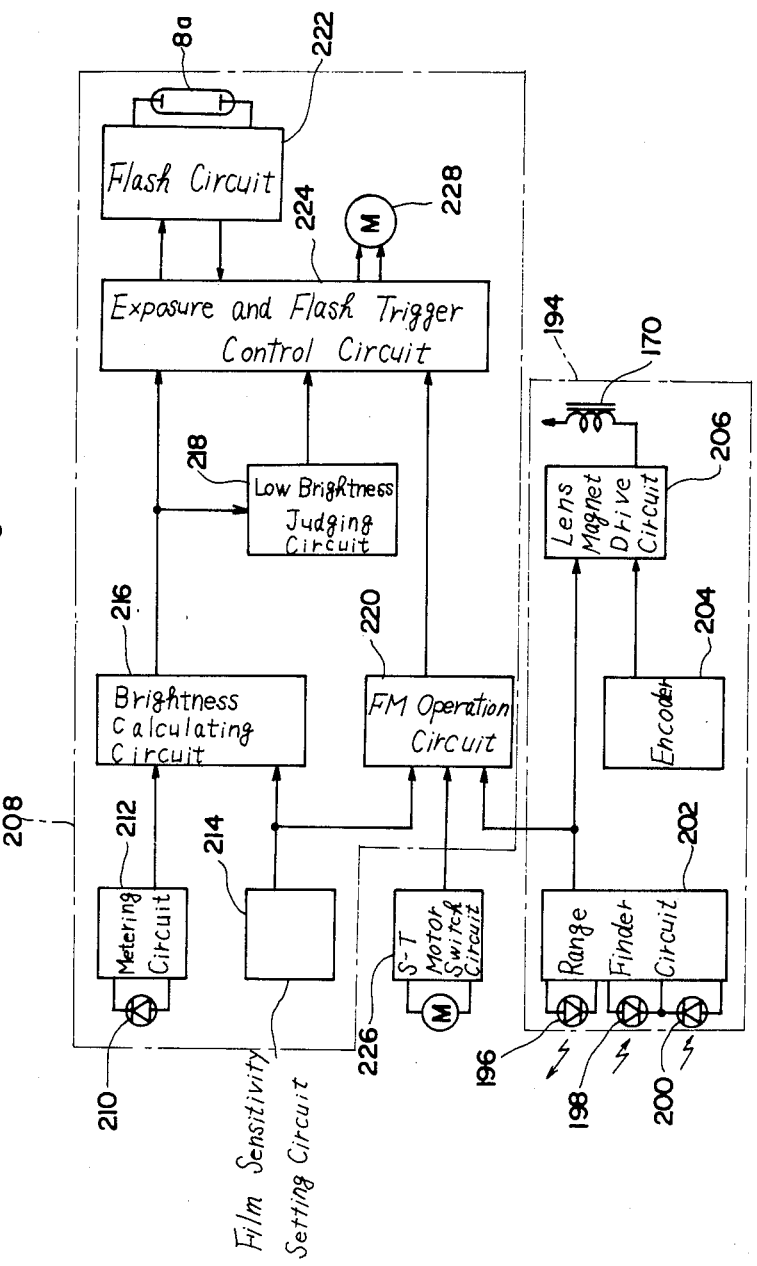
FIG. 16 is a block diagram of a control circuit for the automatic focusing device and other devices.

Referring to FIG. 16, an automatic focusing circuitry 194 of the automatic focus adjusting device comprises a range finder circuit 202 including a light emitting element 196 in the light emitting window 12 and a light receiving element 198 in the light receiving window 14, an encoder 204 including the encoder pattern 162 and the contact piece 164 and adapted to produce a signal corresponding to a rotational position of the passive gear 160, and a lens magnet drive circuit 206 for operating the magnet 170 in response to information received from the range finder circuit 202 concerning the distance of a photographed object and to information received from the encoder 204 concerning a lens position.

In FIG. 16, an exposure controller 208 comprises a meter circuit 212 including a light receiving element 210 in the meter cell window 16, a film sensitivity setting circuit 214 including a manual film sensitivity setter and a device for reading a camera autosensing code (CAS code) on an outer wall of a film cartridge, a brightness calculating circuit 216 for deriving an amount of exposure from outputs of the meter circuit 212 and the film sensitivity setting circuit 214, a low brightness judging circuit 218 for judging whether low brightness or not from the amount of exposure, an FM operation circuit 220 for deriving flashmatic information from information received from the film sensitivity setting circuit 214 concerning film sensitivity and information received from the range finder circuit 202 concerning the distance of the photographed object, namely for deriving information for a lens opening value from the distance of the photographed object, film sensitivity and guide number of the flash unit, and an exposure and flash trigger control circuit 224 for controlling opening and closing of the shutter blades acting also as aperture diaphragm and flash timing of a flash circuit 222 in response to the information on the amount of exposure, the flashmatic information, a low brightness judgment signal, and a signal of charging completion of the flash circuit 222. The FM operation circuit 220 receives a signal from an S-T switch motor drive circuit 226 indicating whether the camera is set for the standard state of the long focal length state and carries out calculations according to the indicated state, i.e. standard or long focal length state. More particularly, since, for example, flashlight from the flash unit travels through the diffuser 10 to reach a photographed object in the standard state but travels without passing through the diffuser 10 in the long focal length state, the FM operation circuit 220 carries out the calculation taking into account changes in the guide number due to the difference in light distribution and absorption of the light by the diffuser 10.

When the brightness is not judged to be low, the exposure and flash trigger control circuit 224 drives the pulse motor 228 in a direction to open the shutter blades and thereafter drives it in a direction to close the shutter blades to obtain an amount of film exposure corresponding to the information on the amount of exposure. On the other hand, when the brightness is judged to be low and the charging of a main capacitor in the flash is completed, the circuit 220 drives the pulse motor 228 to open the shutter blades to an opening value indicated by the flashmatic information derived by the FM operation circuit 220 and causes the flash circuit 222 to effect the flashing.

When a shutter release operation takes place, the meter circuit 212 and the range finder cirucit 202 operate according to a depression to a first step of the release button to store information on the brightness and distance of the photographed object. As the release button is further depressed to a second step, the drive circuit 206 comes into operation to place the lens stop magnet 170 in the drawing state and actuate the release magnet 186. This causes the release lever 184 to move to the release position. Then by the actions of the drive spring 182 and governor mechanism 174 the passive gear 160 pivots at a predetermined speed in the counterclockwise direction in FIG. 12 and the drive plate 176 moves in the direction indicated by an arrow A. The movement of the drive plate 176 is transmitted through the rack 176b, gear 178, gear 180, gear 156, and key grooves 156a to the spline shaft 150 of the cam shaft 146, which pivots the focusing cam 148 and shifts the main lens component ML forwardly.

On the other hand, the rotation of the passive gear 160 causes the contact 164 of the encoder 204 to slide on the encoder pattern 162, and a lens position signal corresponding to an amount of shifting of the main lens component is transmitted from the encoder 204 to the lens magnet drive circuit 206. When the information provided by the range finder circuit 202 concerning the distance of the photographed object and the lens position signal provided by the encoder 204 reach a predetermined relationship, the drive circuit 206 places the stop magnet 170 in a release state permitting the engaging lever 168 to pivot to the engaging position. As a result, the claw 168a engages one of the teeth of the passive gear portion 160c thereby to stop the main lens component ML.

Although the invention has been described as applied to the means for shifting the lens of a bifocal camera, it may be employed also for setting position of a photographic lens of a collapsible mount type camera and for zooming of a camera having a zoom lens system. Furthermore, the present invention is applicable to a camera having at least part of the photographic lenses movable such as a bifocal camera, a collapsible mount type camera, or a camera having a zoom lens, wherein a driven device such as a shutter unit, an aperture diaphragm device or a lens barrier device is movable in unison with the movable lens and wherein this driven device is driven by a drive mechanism mounted in a camera body.

What is claimed is:

1. A camera capable of changing the focal length of a photographic lens system, comprising:
   a main lens component movable between a front position and a rear position along the optical axis of the photographic lens system, said main lens component operating alone as the photographic lens system when located at the rear position;
   an auxiliary lens component movable between a first position and a second position, said auxiliary lens component operating as the photographic lens system with the main lens component when located at the first position;
   means for driving said main lens component;
   means for interrupting the actuation of the driving means when the shifting of said main lens component is interrupted by force, including means for detecting an overload of said driving means to thereby detect the interruption of the actuation of said driving means; and
   means for restricting the shifting of said main lens component between the front position and the rear position.

2. A camera as claimed in claim 1 further comprising means for transmitting the driving force of said driving means to said main lens component, and wherein said overload detecting means includes means for detecting an overload of said transmitting means.

3. A camera as claimed in claim 1 wherein said overload detecting means includes means for counting a time count, means for initiating the time count of said counting means in accordance with stoppage of said main lens component, and means for producing an overload detecting signal when the counted time count reaches a predetermined value.

4. A camera as claimed in claim 3 further comprising means for producing a train of pulses in accordance with the shifting of said main lens component, wherein said counting means includes means for counting the number of said pulses, and wherein said initiating means includes means for starting the pulse count of said pulse number counting means.

5. A camera capable of changing the focal length of a photographic lens system, comprising:
- a main lens component movable between a front position and a rear position along the optical axis of the photographic lens system, said main lens component operating alone as the photographic lens system when located at the rear position;
- an auxiliary lens component movable between a first position and a second position, said auxiliary lens component operating as the photographic lens system with the main lens component when located at the first position;
- means for driving said main lens component;
- means for interrupting the actuation of the driving means when the shifting of said main lens component is interrupted by force;
- means for restricting the shifting of said main lens component between the front position and the rear position;
- means for protecting the front surface of said main lens component, said protecting means being movable between a closed position for protecting said main lens component and an open position retracted from the optical axis;
- a manual operating member movable between a first operating position for bringing said protecting means to the closed position and a second operating position for bringing said protecting means to the open position; and
- means for linking said manual operating member to said protecting means so that said manual operating member is linked to said protecting means when said main lens component is located at the rear position, and said manual operating member is independent of said protecting means when said main lens component is located at the front position.

6. A camera as claimed in claim 5 wherein said linking means is constructed so that said protecting means is moved to the closed position when said main lens component is shifted to the rear position in the condition where said manual operating member is located at the first operating position.

7. A camera as claimed in claim 6 wherein said linking means includes a cam member having a cam surface inclined along the optical axis, and a sliding member slidable along the cam surface of said cam member in accordance with the shifting of said main lens component toward its rear position, wherein said protecting means is brought to its closed position in accordance with the shifting of one of said cam member and said sliding member in the direction perpendicular to the optical axis.

8. A camera as claimed in claim 5 wherein said manual operating member is movable between two positions when shifted to said second operating position for changing the positions of said main and auxiliary lens components.

9. A camera capable of changing the focal length of a photographic lens system comprising:
- a main lens component movable between a front position and a rear position along the optical axis of the photographic lens system, said main lens component operating alone as the photographic lens system when located at the rear position;
- an auxiliary lens component movable between a first position and a second position, said auxiliary lens component operating as the photographic lens system with the main lens component when located at the first position;
- means for driving said main lens component;
- means for interrupting the actuation of the driving means when the shifting of said main lens component is interrupted by force;
- means for restricting the shifting of said main lens component between the front position and the rear position;
- a first supporting member for supporting said main lens component,
- a fixed member, fixed to a camera body, for supporting said first supporting member, so that said main lens component is shiftable between the front position and the rear position, said fixed member having a cam portion,
- a second supporting member for supporting said auxiliary lens component, said second supporting member being supported by said first supporting member so that said second supporting member is rotatable relative to said first supporting member, and
- a cam follower connected to the cam portion of said fixed member and linked to said second supporting member for shifting said auxiliary lens component between the first and second positions in accordance with the shifting of said main lens component along the optical axis.

10. A camera as claimed in claim 9 further comprising means for urging said auxiliary lens component to its first position, and wherein said auxiliary lens component is rotated to the first position in accordance with the shifting of said main lens component toward the rear position.

11. A camera as claimed in claim 9 further comprising means for linking said cam follower to said second supporting member, including a rotatable lever having said cam follower and a rotatable member provided on said second supporting member.

12. A camera as claimed in claim 9 further comprising means for adjusting the position of said auxiliary lens component along the optical axis to adjust the back focal distance of the photographic lens system including said main and auxiliary lens components, said adjusting means being located near a rotational axis of said second supporting member.

13. A camera capable of changing the focal length of a photographic lens system comprising:
- a main lens component movable between a front position and a rear position along the optical axis of the photographic lens system, said main lens component operating alone as the photographic lens system when located at the rear position;

an auxiliary lens component movable between a first position and a second position, said auxiliary lens component operating as the photographic lens system with the main lens component when located at the first position;

means for driving said main lens component;

means for interrupting the actuation of the driving means when the shifting of said main lens component is interrupted by force;

means for restricting the shifting of said main lens component between the front position and the rear position;

a supporting member for supporting said main lens component, said supporting member being movable along the optical axis for shifting said main lens component between said front and rear positions, a rotatable member rotated by said driving means, and means for linking said rotatable member to said supporting member so that said supporting member is shifted along the optical axis in accordance with the rotation of said rotatable member, said linking means including a crank mechanism in which said rotatable member is used as a crank thereof to shift said main lens component along the optical axis, said crank mechanism being constructed so that said main lens component is stopped in one of said front and rear positions in the condition when said crank mechanism almost reaches one of a first dead point and a second dead point rotated a half cycle from said first dead point.

14. A camera as claimed in claim 13 wherein said driving means includes a motor, and means for transmitting the driving force of said motor to said rotatable member while reducing the rotational speed of said motor.

15. A camera capable of changing the focal length of a photographic lens system comprising:

a main lens component movable between a front position and a rear position along the optical axis of the photographic lens system, said main lens component operating alone as the photographic lens system when located at the rear position;

an auxiliary lens component movable between a first position and a second position, said auxiliary lens component operating as the photographic lens system with the main lens component when located at the first position;

means for driving said main lens component;

means for interrupting the actuation of the driving means when the shifting of said main lens component is interrupted by force;

means for restricting the shifting of said main lens component between the front position and the rear position;

an auxiliary device movable integrally with said main lens component, means, fixed to a camera body, for controlling said auxiliary device, and means for linking said controlling means to said auxiliary device, including a driving member rotated by said controlling means, the rotational axis of said driving member being parallel to the optical axis, and a transmitting member linked to said driving member so that said transmitting member is slidable along the optical axis relative to said driving member while being rotatable integrally with said driving member, the rotational axis of said transmitting member being parallel to the optical axis.

16. A camera as claimed in claim 15 wherein said main lens component is projected from a camera body when located at said front position, while it is positioned within the camera body when located at said second position.

17. A camera as claimed in claim 15 wherein said auxiliary device is means for shifting said main lens component, and wherein said controlling means includes means for controlling the axial position of said main lens component for focusing the photographic lens system in accordance with distance to an object to be photographed.

18. A camera as claimed in claim 15 wherein said transmitting member is a spline.

19. A camera capable of changing the focal length of a photographic lens system, comprising:

a main lens component movable between a front position and a rear position along the optical axis of the photographic lens system, said main lens component operating alone as the photographic lens system when located at the rear position;

an auxiliary lens component movable between a first position and a second position, said auxiliary lens component operating as the photographic lens system with the main lens component when located at the first position;

a first supporting member for supporting said main lens component, a fixed member, fixed to a camera body, for supporting said first supporting member so that said main lens component is shiftable between the front position and the rear position, said fixed member having a cam portion defining a projection whose position around the optical axis varies in accordance with its position along the optical axis, a second supporting member for supporting said auxiliary lens component, said second supporting member being supported by said first supporting member so that said second supporting member is rotatable relative to said first supporting member, and a cam follower connected to the cam portion of said fixed member and linked to said second supporting member for shifting said auxiliary lens component between the first and second positions in accordance with the shifting of said main lens component along the optical axis.

20. A camera as claimed in claim 19 further comprising means for urging said auxiliary lens component to its first position, and wherein said auxiliary lens component is rotated to the first position in accordance with the shifting of said main lens component toward the rear position.

21. A camera as claimed in claim 19 further comprising means for linking said cam follower to said second supporting member, including a rotatable lever having said cam follower and a rotatable member provided on said second supporting member.

22. A camera as claimed in claim 19 further comprising means for adjusting the position of said auxiliary lens component along the optical axis to adjust the back focal distance of the photographic lens system including said main and auxiliary lens components, said adjusting means being located near a rotational axis of said second supporting member.

23. A camera capable of changing focal length of a photographic lens system, comprising:
- a main lens component movable between a front position and a rear position along the optical axis of the photographic lens system, said main lens component operating alone as the photographic lens system when located at the rear position;
- an auxiliary lens component movable between a first position and a second position, said auxiliary lens component operating as the photographic lens system with the main lens component when located at the first position;
- a supporting member for supporting said main lens component, said supporting member being movable along the optical axis for shifting said main lens component between said front and rear positions,
- a rotatable member rotated by said driving means, and
- means for linking said rotatable member to said supporting member so that said supporting member is shifted along the optical axis in accordance with the rotation of said rotatable member, said linking means including a crank mechanism in which said rotatable member is used as a crank thereof to shift said main lens component along the optical axis, said crank mechanism being constructed so that said main lens component is stopped in one of said front and rear positions in the condition when said crank mechanism reaches almost to one of a first dead point and a second dead point rotated a half cycle from said first dead point.

24. A camera as claimed in claim 23 wherein said driving means includes a motor, and means for transmitting the driving force of said motor to said rotatable member with reducing the rotational speed of said motor.

25. A camera capable of changing focal length of a photographic lens system, comprising:
- a main lens component movable between a front position and a rear position along the optical axis of the photographic lens system, said main lens component operating alone as the photographic lens system when located at the rear position;
- an auxiliary lens component movable between a first position and a second position, said auxiliary lens component operating as the photographic lens system with the main lens component when located at the first position;
- an auxiliary device movable integrally with said main lens component,
- means, fixed to a camera body, for controlling said auxiliary device, and
- means for linking said controlling means to said auxiliary device, including a driving member rotated by said controlling means, the rotational axis of said driving member being in parallel to the optical axis, and a transmitting member linked to said driving member so that said transmitting member is slidable along the optical axis relatively to said driving member while rotatable integrally with said driving member, the rotational axis of said transmitting member being in parallel to the optical axis.

26. A camera as claimed in claim 25 wherein said main lens component is projected from a camera body when located at said front position, while it is positioned within the camera body when located at said second position.

27. A camera as claimed in claim 25 wherein said auxiliary device is means for shifting said main lens component, and wherein said controlling means includes means for controlling the axial position of said main lens component for focusing the photographic lens system in accordance with distance to an object to be photographed.

28. A camera as claimed in claim 25 wherein said transmitting member is a spline.

29. A camera capable of changing focal length of a photographic lens system, comprising:
- a main lens component movable between a front position and a rear position along the optical axis of said photographic lens system, said main lens component operating alone as the photographic lens system when located at the rear position;
- an auxiliary lens component movable between a first position on the optical axis and a second position off the optical axis, said auxiliary lens component operating as the photographic lens system with the main lens component when located at the first position;
- an electric device movable integrally with said main lens component along the optical axis;
- an electric circuit fixed along the optical axis; and
- connecting means for connecting said electric device to said electric circuit, said connecting means being flexible so that said connecting means is located at the side of said auxiliary lens component when said auxiliary lens component is positioned in the second position, and that said connecting means is located at the space where said auxiliary lens component is positioned in the second position when said auxiliary lens component is positioned in the first position.

30. A camera as claimed in claim 29 wherein said connecting means and said electric circuit are arranged under the photographic lens system.

31. A camera comprising:
- a lens component movable along its optical axis;
- an outer barrel having a rectangular cross section and projections each provided at each corner of said rectangular cross section;
- an inner barrel for supporting integrally said lens component, said inner barrel having a rectangular cross section corresponding to that of said outer barrel, and being slidable relatively to said outer barrel along the optical axis with guiding by said projections; and,
- a light interrupting member of a flexible material attached to the inner surface of said outer barrel with being slidable to the outer surface of said inner barrel.

* * * * *